INVENTORS.
Elwyn E. Merrill
William E. Rittenhouse
Earl W. Veazey
Stanley S. Tobol

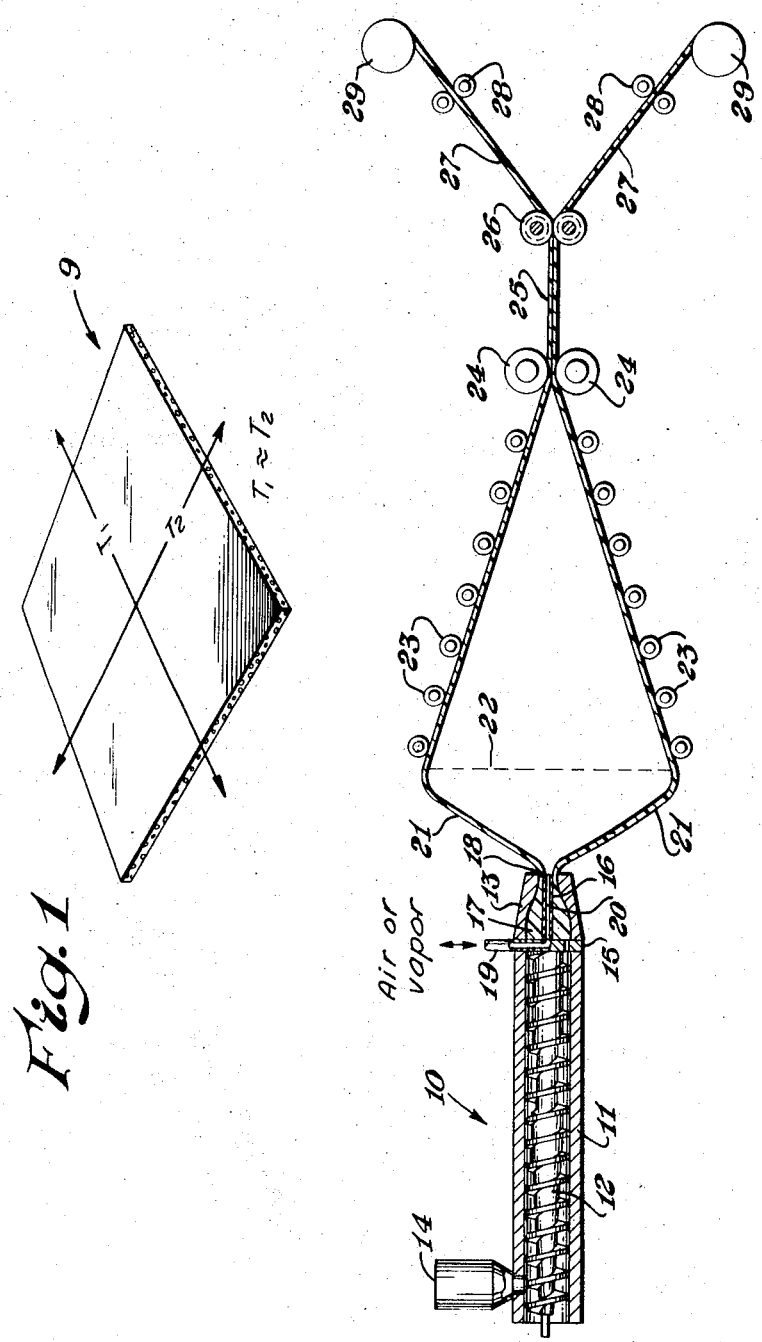

BY
ATTORNEY

United States Patent Office 3,343,216
Patented Sept. 26, 1967

3,343,216
APPARATUS FOR THE PREPARATION OF FOAMED SHEET MATERIAL
Elwyn E. Merrill, Midland, Mich., and Stanley S. Tabol, Gales Ferry, and Earl W. Veazey and William E. Rittenhouse, Old Saybrook, Conn., assignors to The Dow Chemical Company, Midland, Mich., a corporation of Delaware
Original application Oct. 22, 1962, Ser. No. 233,497, now Patent No. 3,248,462, dated Apr. 26, 1966. Divided and this application Oct. 22, 1965, Ser. No. 513,888
1 Claim. (Cl. 18—14)

ABSTRACT OF THE DISCLOSURE

Foamed polystyrene sheet is prepared by the trapped bubble process wherein the extruded tube is stretched from about 10 to 30 times the original diameter of the unoriented foamed tube.

---

This application is a division of copending application Ser. No. 233,497, filed Oct. 22, 1962 and now Patent No. 3,248,462.

This invention relates to extruded expanded styrene polymer foam sheets and to apparatus for extruding and foaming a styrene polymer into sheet or film-like shapes. It is particularly concerned with producing such sheets and structures that are characterized in having approximately equal physical properties in both the longitudinal and the transverse directions of the sheet or film.

It is known to produce foamed polystyrene in thin sheet form as shown for example in U.S. Patent No. 2,917,217. Also of relative interest is the teaching in British Patent 854,586 which shows that expandable polystyrene can be extruded into a tube having a minimum wall thickness of about 0.005 inch, or in other terms, a sheet thickness of about 0.005 inch. The crux of the invention of the British patent is taught to lie in the particular blowing agent employed.

When foamed film is produced, it is preferable, as substantiated by the prior art, to employ conventional blown film extrusion techniques. That is to say, a molten thermoplastic resin is extruded as a cylindrical tube through an annular orifice die and stretched or oriented into a film. The tube is usually prevented from collapsing and is actually expanded by an air bubble trapped between the extrusion die and a pair of take-away rolls. Air may be withdrawn from or entered into the bubble, if desired, through a centrally located mandrel in the annular orifice of the extrusion die. The tube, after being collapsed, is generally cut on the edges and the resulting two sheets are separated and wound on conventional winding equipment.

The above-described method has been generally satisfactory for producing foamed films or sheets; however, the prior art has heretofore not been able to provide foamed sheet products of exceptionally small thicknesses and small cell size that exhibit good transverse physical properties, for instance, transverse properties that approximate the longitudinal properties.

It would be of advantage to have available foamed film products, that have excellent and essentially equal tensile properties in the longitudinal and transverse directions of the film. (It is, of course, to be understood that the longitudinal direction of the film corresponds to the direction of extrusion or machine direction, and the transverse direction is taken perpendicular to the longitudinal direction.) Such qualities would be particularly beneficial when the foamed film must be subjected to equal strains in more than one direction. For instance, when a foamed film product as herein described is to be utilized as a box liner, it must be bent or flexed in two directions simultaneously if a continuous liner is to be achieved absent any joints. If, and as has been the case, the film does not possess equal tensile, flexibility or toughness or whatever property might be measured or terminology employed, in both, or for that matter, in all directions, ruptures, cracks, tears and the like are quite apt to occur in the film due to internal and external strains. Other advantages of having bi-directional equality in physical properties will be readily apparent to the artisan. As a for instance, while working with the film, no pains need be taken to keep account of which is the machine direction of the film and which is the transverse direction or the like cognizance.

Accordingly, it is the chief object and concern of the present invention to provide an apparatus especially designed to produce the extruded foamed film products having essentially equal physical properties in biaxial direction.

It is yet another object of the invention to provide an apparatus that enables foamed film products to be manufactured at moderate temperatures and pressures.

In accordance with the invention, expanded polystyrene in film or sheet-like form having essentially equal tensile properties in biaxial directions is prepared by means of extruding a fused styrene polymer containing an agent capable of expanding and creating voids in the extruded styrene polymer through an annular die to form a continuous tube of the polymer, and immediately after the extrusion through the die, increasing the diameter of the tube to between about 10 and about 30 times the diameter of the initially formed tube exuding from the die.

When employing the conventional blown film method as indicated, a large bubble is formed which is at its largest circumference essentially circular. Hence, a circumferential orientation of the film is effected. However, despite this seemingly uniform radial orientation, the extruded foamed film products of the prior art exhibit significantly inferior physical properties, notably tensile properties, in the transverse direction of the film when contrasted to the physical properties in the longitudinal or machine direction. This is believed to be a result of the take-away equipment utilized after the bubble is collapsed which induces further orientation of the film in the machine direction.

In surprising contrast, it has now been found that when blow-up ratios, i.e., the ratio of the largest diameter of the film bubble to the diameter of the extrusion die orifice, in the range of about 10:1 to about 30:1, and preferably between about 10:1 and about 20:1, are employed that film of approximately equal, if not equal, tensile properties in biaxial directions are obtained. The reasons for this are not fully understood, particularly when account is taken of the fact that no greater orientation is obtained in any particular radial direction relative to another about the circumference of the blown bubble. That is, the bubble is still essentially circular at any place where the circumference is measured, the same as when lesser blow-up ratios than those of the present invention are employed. Thus, the superior physical properties observed in the foamed film products produced by practice of the present invention were completely unobvious and unexpected.

The unpredictability of the present invention stems in large measure from the fact that heretofore it has not been possible to prepare extruded foamed polystyrene film, at least of uniform and essentially flawless quality, on conventional extrusion equipment when such large blow-up ratios are employed.

Further features and the many cognate benefits and associated advantages of the invention will be additionally emphasized in the ensuing description and specification, which, as it is described, may be better understood with reference to the accompanying drawing, wherein like reference numerals are employed to indicate like parts whenever possible, and wherein:

FIGURE 1 perspectively depicts an extruded foamed polystyrene film prepared in accordance with the invention;

FIGURE 2, in schematic and diagrammatic elevation, partly in cross-section, illustrates one means of preparing extruded foamed polystyrene film products in accordance with the invention;

Figure 3:
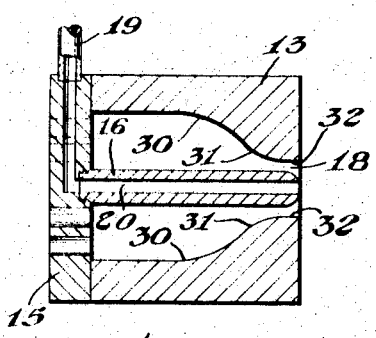
FIGURE 3 is an elevational view, partly in cross-section, illustrating one embodiment of the extrusion die that may be employed in the practice of the invention.

With initial reference to FIGURE 1, there is illustrated the extruded foamed polystyrene film prepared by the present invention, generally designated by the reference numeral 9. The foamed film is characterized in being unicellular, of low density, and having essentially equal tensile properties in biaxial directions as indicated in FIGURE 1, wherein the symbols $T_1$ and $T_2$ represent the tensile strengths in the longitudinal and transverse directions respectively of the film product.

With reference to FIGURE 2 of the drawing, there is shown an extruder, generally designated by the numeral 10, consisting of a barrel 11 in which is rotatably mounted an extruder screw 12. Extrusion die 13 is secured to the end of barrel 11 through breaker plate 15, in matching relationship with screw 12. The screw 12 is driven from an external power supply from the left (not shown) such as a chain or gear drive arrangement. Expandable polystyrene, preferably in the form of solid particles such as pellets or the like, is introduced to the extruder screw 12 from hopper 14. As indicated in FIGURE 2, the extruder screw may have essentially three compartments which will be more fully described herein later. The expandable polystyrene particles are melted while being forwarded through barrel 11 towards extrusion die 13 by suitable heating means (not shown) serving to heat the barrel. Heating elements may be contiguous with the barrel for its full length or spaced intermittently along the barrel. A certain amount of heat is generated by friction between the polymer and extruder surfaces which may assist in melting the solid polymer. In this respect, after the initial start-up, it is generally necessary to actually cool the barrel, e.g., with air blowers or circulating liquid, to compensate for the heat generated by friction. The molten expandable polymer is thus forced through breaker plate 15 which supports mandrel 16. The polymer flows around mandrel 16 filling the space 17 of die 13 and out through annular orifice 18 formed between die 13 and mandrel 16. Air, under slight pressure, may be entered (or withdrawn) through duct 19 which passes through breaker plate 15 and is interconnected with duct 20 passing centrally through mandrel 16 and terminating at the extremity of mandrel 16.

The foamable polystyrene emerging from die 13 is extruded into air or some other suitable inert medium, which is conveniently at room temperature, and upon contact of which the molten polymer begins to solidify forming a continuous or seamless tube of the polystyrene. The heated expandable polymer, expandable by virtue of containing agents commonly referred to as blowing agents, expands internally when subjected to the atmospheric pressure outside the extrusion die, thus forming a foamed film tube. Thus, a simultaneous extrusion and foaming operation is effected. The freshly formed tube is then immediately inflated, expanded or ballooned-out by virtue of the pressure inside the tube provided by the gas, e.g. air, introduced through ducts 19 and 20. Depending on operating conditions, it may not be necessary to continuously add air to the expanded tube. It may be necessary in fact to withdraw air (or other gases) from the tube during operation due to the foam-inducing gases in the expandable polymer permeating to the inside of the tube. The tube of expanded polystyrene 21 is inflated to about 10 to 30 times the diameter of the orifice opening 18 (using as a reference the measurement at the greatest diameter 22 as indicated by the dotted line in FIGURE 2, of the tube 21. The tube 21 is then forwarded and supported by rolls 23 into the nip of collapsing rolls 24. The collapsed tube 25 advances over cutter 26 which trims the edges from collapsed tube 25 providing two independent sheets 27. The sheets are separated, passed through guide rolls 28 and onto take-up rolls 29. Of course, if desired, the cutter may be by-passed and a double-thickness sheet obtained which can be used as a double-thickness sheet, or as tubing. Also, instead of being stored on rolls 29, the foamed film may be passed directly to other processing treatments or manufacturing operations.

The foamed film products obtained by the present invention have excellent physical properties, and, as indicated, outstanding properties in the respect that the products have essentially equal physical properties in biaxial directions. Film can be made employing the present invention that ranges in thickness from about 0.0005 in. (½ mil) to 0.75 in. or so and having a density of from about 1 or less to about 20 pounds per cubic foot. The product is unicellular; i.e., closed celled, the cell size being variant depending on several factors including the temperature and pressure of the extrusion process and the type and amount of blowing agent, incorporated in the polymer. Thus, cells, which are essentially spherical, having diameters between about 200 mils and 0.2 mil may conveniently be had with practice of the present invention. Varying degrees of gloss on the film surface can be produced from a satiny to a soft matte finish according to chosen processing conditions. An especially advantageous and beneficial feature of the foamed film is its flexibility in both its transverse and longitudinal directions. Thus, it is readily flexed and bent through an angle of 180° many times in either direction without any signs of rupture. Accordingly, the tear strength in both transverse and longitudinal directions is of equal or near equal value which has obvious advantages.

As discussed in the parent application Ser. No. 233,497, it is an important feature of the present invention that a blow-up or inflation ratio of between about 10:1 to about 30:1 be employed when producing the foamed film products having substantially biaxial equal properties. When a blow-up ratio of less than about 10:1 is employed, products of significantly inferior quality are obtained regards equality of, for example, tensile properties in the transverse and longitudinal directions of the film. On the other hand, when blow-up ratios of much in excess of about 30:1 are employed, frequent rupture and pin-holing of the bubble are evidenced leading to excessive down-time of the operation as well as inferior film products. Particularly advantageous and beneficial results are achieved when blow-up ratios in the range of about 15:1 to 20:1 are utilized.

A corollary benefit and feature of being able to employ the blow-up ratios provided by the present invention, which is of significant note, is that material increases in production rates are achieved.

It is one of the essential features of the present invention to be able to obtain the blow-up ratios necessary to the production of the foamed film products at relatively low temperatures and pressures. This is for reasons that if excessive temperatures are encountered in the extrusion die the fused foamable styrene polymer will tend to foam in the die causing rupture in the cells upon extrusion through the orifice. The premature foaming can be somewhat compensated for by increasing the pressure in the die; however, the increase in pressure of itself tends to cause hot spots also resulting in premature foaming. In accordance with the present invention, a means is provided for overcoming this tendency to foam in the die and simultaneously to provide the utilization of heretofore unattainable blow-up ratios when extruding foamable styrene polymers at moderate temperatures and pressures. This feature of the invention involves a novel combination of extruder screw and extrusion die, which is more fully delineated with reference to the accompanying drawing.

In this respect and with reference to FIGURE 3, there is shown one embodiment of an extrusion die 13 that is employed in the present invention. As indicated, the inside surface 30 of die 13 slopes gradually but with an ever-increasing slope from the juncture with the breaker plate 15 to the neck 31 of the die. From neck 31, the slope decreases to the die land 32 of the annular opening 18. Mandrel 16 should be at least coextensive with die 13, and, as illustrated, may extend slightly beyond the die edge.

Figure 4:
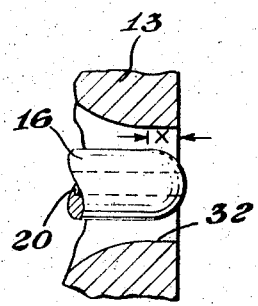
FIGURE 4 is a fragmentary view, partly in cross-section, of the die land area of the extrusion die of FIGURE 3.

As illustrated in FIGURE 4, die land 32 is a straight flat section, as indicated by the dimension $x$ in FIGURE 4, parallel to the axis of extrusion.

Figure 5:
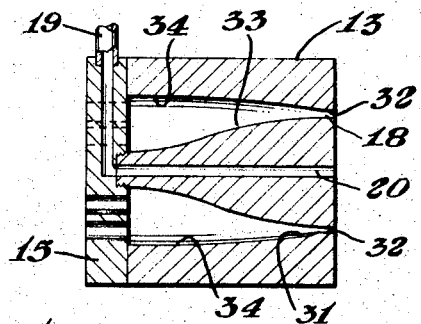
FIGURE 5 is an elevational view, partly in cross-section, illustrating another embodiment of the extrusion die that may be employed in the practice of the invention.

With reference to FIGURE 5, there is shown another embodiment of a die design that may be utilized in the practice of the invention. The inside surfaces 34 of die 13 slope gradually from breaker plate 15 to the die land 32. Here, as before, the die land 32 is essentially parallel to the axis of extrusion. The sides of mandrel 33 progress initially from breaker plate 15 in an essentially parallel relationship with the axis of extrusion and then follow an increased and relatively constant slope until reaching the neck 31 of the annular opening 18 where the slope decreases to nearly zero.

Figure 6:
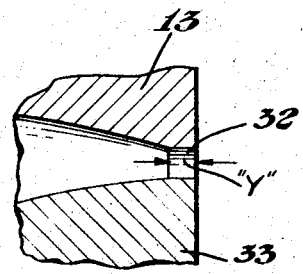
FIGURE 6 is a fragmentary view, partly in cross-section, of the die land area of the extrusion die of FIGURE 5.

In FIGURE 6 is illustrated the relationship of the straight, flat die land 32 to the opening 18 and mandrel 33. The die land 32 has an edge essentially parallel to the axis of extrusion and a length indicated by the dimension $y$ in FIGURE 6.

Figure 7:
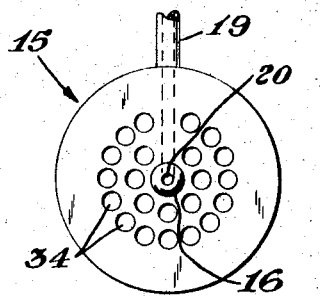
FIGURE 7 is a front view of a breaker plate that may be employed in the practice of the invention; and, FIGURE 8 is an elevational view of an extruded screw that is employed in the practice of the present invention.

In FIGURE 7 is illustrated a breaker plate 15 suitably employed in the invention. The fused polymer flows through apertures 34 into the extrusion die and around mandrel 16.

The extrusion die that is employed in the practice of the invention, as indicated in FIGURES 3 and 5 of the accompanying drawing, has smooth sloping surfaces, which, in association with the centrally positioned mandrel, gradually decrease the internal volume of the die. Thus is provided a flow of polymer through the die from the breaker plate to the die land with negligible pressure drop, and essentially completely all of the pressure drop is made to be taken across the straight die land. This is an anomoly when contrasted to the prior art wherein attempts are usually made to provide a significant pressure drop through the full length of the extrusion die so that uniform polymer flow is attained. In the present invention uniform polymer flow is afforded without resorting to pressure drop in the die. In this respect, the pressure drop across the die land must be sufficient to provide back pressure enough to prevent the polymer from foaming in the die.

In general, the width of the die land will increase as the orifice diameter increases. To provide sufficient back pressure to prevent foaming in the die, and simultaneously provide the indicated beneficial blow-up ratios, the ratio of the length of the die land (as measured in the direction of extrusion as indicated by the dimensions $x$ and $y$ in FIGURES 4 and 6, respectively) to the orifice diameter is advantageously between about 1:10 and 1:14 and preferably about 1:12. Thus, for a ⅜ inch diameter orifice the length of the die land is about 1/32 inch, and for a 3 inch diameter orifice the length of the die land is about ¼ inch.

A corollary advantage of the die design employed in practice of the present invention is its relative shortness. This allows for a short mandrel thus minimizing the inherent tendency of the mandrel to bend or flex. Variations in the mandrel alignment will result in non-uniform film thickness. The ability to position the breaker plate adjacent the extruder terminus has further advantages in that, weld line formation in the film is elleviated which is a severe problem when relatively low temperature extrusion is employed.

Figure 8:
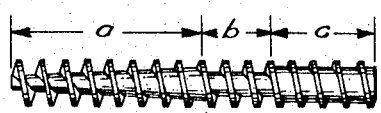

With reference now to FIG. 8, there is shown an extruder screw that is a particularly advantageous embodiment of the invention. As illustrated, the screw consists of essentially three parts having constant pitch and diameter flights but varying root diameters as follows: (1) an end section, indicated by the length $a$, having an increasing root diameter; (2) a middle section, indicated by the length $b$, having a constant root diameter of substantially smaller root diameter than the adjacent root diameter of section $a$; and, (3) an end section, indicated by the length $c$, having a constant but greater root diameter than the root diameter of section $b$.

For purposes of extruding the styrene polymers in accordance with the invention, the section $a$ of the extruder screw is advantageously about ½ the length of the total screw length, and sections $b$ and $c$ are each about ¼ the length of the total screw length. Section $a$ is a compression zone and beneficially provides a compression ratio of about 2:1. Section $b$ is a depressurizing zone where a lowering of the internal pressure is effected. Section $c$ is more or less a pumping section which forwards the polymer to the breaker plate. A preferable embodiment is to employ an extruder screw with about a 24:1 length to flight diameter ratio.

Although extrusion can be practiced at any convenient temperature compatible with the particular polymer involved, as indicated hereinbefore, it is desirable to employ relatively low or moderate temperatures when employing the present apparatus. Thus, temperatures from about 200° to 375° F. are preferred in the practice of the invention.

Similarly, as to pressure, conventional extruding pressures may be employed, for example, between about 100 and 5000 p.s.i. However, beneficially, pressures utilized in operating the present apparatus are between about 200 and 2000 p.s.i. and advantageously about 700 to 1500 p.s.i. It is most beneficial to maintain sufficient pressure in the extruder screw and extrusion die so that a minimum, and advantageously none, of the foamable polymer is allowed to foam at the temperature employed prior to being extruded through the annular orifice.

Polystyrene is the preferred thermoplastic polymer that is employed with the present apparatus, but other thermoplastic benzene soluble vinyl aromatic resins such as the solid polymers and copolymers of ortho-methylstyrene, para-methylstyrene, meta-chlorostyrene and copolymers of any of these compounds with styrene, or copolymers of styrene, and alpha-methylstyrene, or para-methyl-alpha-methyl styrene with any of the above compounds may be used. Or, copolymers of the above styrene compounds with other mono-ethylenically unsaturated monomers such as methylmethacrylate, acrylonitrile, etc. wherein the copolymer contains at least about 50 weight percent of the styrene compound, based on the weight of the copolymer, may be used.

It is usually preferred to employ foamable styrene polymer compositions in practicing the invention. That is to say, solid polymers are used in the form of pellets or the like containing blowing agents capable of expanding the melted polymer internally as described herein previously. In this instance, the polymer may have incorporated in its solid structure from about 3 to about 10 weight percent of an aliphatic hydrocarbon blowing agent boiling in the range of 85–180° F., and from about 0–10 weight percent of a nucleating agent, based on the weight of the composition. Particularly beneficial for the aliphatic hydrocarbon is pentane, or the pentane and hexane fractions. Calcium silicate and other of the known nucleating agents are advantageous in carrying out the invention. Generally advantageous results are obtained with from about 5 to 7 weight percent of the hydrocarbon blowing agent and from 0 to about 2.5 weight percent of the nucleating agent, based on the weight of the composition.

If desired, other agents which are suited to liberate carbon dioxide may be incorporated in the polymeric compositions. For example, such agents include the carbon dioxide liberating agents of lithium, sodium, potassium, calcium, strontium, barium and ammonium carbonates and bicarbonates in combination with an organic acid such as malonic, fumaric, itaconic, formic, acetic, citric, tartaric, butyric etc. or boric acid which reacts with the carbon-dioxide liberating agent to yield carbon dioxide.

However, it is one of the corollary features and benefits of this invention to be able to produce extremely low density, fine celled and biaxially flexible foamed film without the need to employ any of the carbon dioxide liberating agents that the art teaches is necessary for this accomplishment. Although, as indicated, these carbon dioxide liberating agents may be employed in practice of the present invention, extreme care must be exercised when they are used due to the propensity of a "cheezy" and hence weak film structure to develop. The ability to avoid their use has obvious advantages. Not only are material and processing costs reduced, but the adverse corrosive effects of the acids on extrusion equipment is avoided.

Instead of operating with solid polymer, polymer in molten form may be fed under pressure directly to the extruder. If this mode is chosen, the blowing agents described in the foregoing may be used or a normally gaseous agent may be incorporated in the polymer melt. The normally gaseous agent employed in forming the cellular product should be soluble in, or at least partially soluble in, the polystyrene resin so as to form a mobile gel therein. Methyl chloride is the preferred normally gaseous agent, although other normally gaseous monoalkyl halides such as methyl bromide, or ethyl chloride may be used. These normally gaseous agents may additionally be used in combination with ammonia or with the normally gaseous agents such as methyl ether, methylethyl ether, dichlorodifluoromethane, propylene or butylene.

The following illustrative examples are given to further delineate the invention but are not to be considered as delimiting the present invention in any manner. Unless otherwise specified, all parts and percentages are by weight.

EXAMPLE 1

Homopolymeric polystyrene, in pellet form, having incorporated therein about 5 percent pentane and about 1 percent calcium silicate, based on the weight of the resulting composition, was fed through a hopper to the feed end of an extruder screw. The extruder screw, a 2½ inch diameter (flight diameter) 24:1 $L/D$ screw, consisted of essentially three constant pitch flight sections, namely, the feed end or compression zone having an increasing root diameter for about one-half the length of the screw, then a smaller root diameter for about one-quarter the length of the screw, and a pumping section of larger root diameter for about the last one-quarter of the screw length. The extruder was heated to about 250° F. The pumping end of the screw terminated adjacent a breaker plate which supported a mandrel. The molten polymer was forced through circular apertures in the breaker plate and around a mandrel centered in and supported by the breaker plate. The die had a gradual but changing slope from the breaker plate to die land and a general configuration of the one illustrated in FIGURE 3 of the accompanying drawing. The die lands were about ⅛ inch long and essentially straight and parallel to the mandrel. The orifice through which the polymer tube was extruded had a 1½ inch diameter and a radial opening of about 0.030 inch. The die was maintained at about 240° F. from the heated polymer alone. The pressure in the die was about 500 p.s.i. Upon emerging from the die, the polystyrene foamed into a unicellular seamless tube which was inflated to a diameter about 17 times the diameter of the orifice (blow-up ratio of 17:1). The bubble was originally formed by trapping air previously admitted through the center of the mandrel. The so-formed expanded tube or bubble was collapsed by passing it through the nip of a pair of take-away rolls positioned about 8 feet from the die face. The flattened sheet was then edge trimmed and separated into two sheets which were subsequently taken up on rolls. A polymer extrusion rate of 125 pounds per hour, and a take-away speed of 125 feet per minute, measured at the take-away rolls, were used.

Following the foregoing procedure, additional foamed sheet products were produced utilizing blow-up ratios of about 22:1 and about 6:1.

The results are set forth in the following table.

| Blow-Up Ratio | Take-Away Speed (ft./min.) | Film Thickness (mils) | Density (lb./ft.³) | Longitudinal | | Transverse | | Mullen Burst Strength (p.s.i.) |
| --- | --- | --- | --- | --- | --- | --- | --- | --- |
| | | | | Tensile Strength (p.s.i.) | Elongation (percent) | Tensile Strength (p.s.i.) | Elongation (percent) | |
| 17:1 | 125 | 5 | 5 | 1,150 | 4 | 1,125 | 3.5 | 12 |
| 22:1 | 150 | 3 | 3 | 850 | 4 | 800 | 3.6 | 7 |
| 6:1 | 150 | 5 | 8 | 1,150 | 3 | 425 | 1.5 | 4.5 |

EXAMPLE 2

In accordance with the procedure of Example 1 attempts are made to produce the foamed polystyrene film using a blow-up ratio of 17:1 with the exception that variations in the extruder screw or the extrusion die or combinations thereof are employed as follows:

(A) Conventional 2½ inch diameter constant root diameter extrusion screw and conventional straight sided "pipe" extrusion die;

(B) Extrusion screw of Example 1 and conventional straight sided "pipe" extrusion die;

(C) Conventional 2½ inch diameter constant root diameter extrusion screw and extrusion die of Example 1.

It is found that in (A) above that foamed film cannot be produced at a blow-up ratio of 17:1. The process is inoperable at these conditions of temperature pressure and blow-up ratio with this apparatus.

Similarly, regards (B) above, although indications are that a more useful process results than in (A) for producing the products of the present invention, for the most part, the process is inoperable and much inferior products are obtained in contrast to the product of Example 1 wherein a blow-up ratio of 17:1 was used.

In regard to (C) above, although it is possible to obtain foamed film having the general characteristics of the products of the invention, but only with difficulty, the resulting foamed film is inferior to the similarly produced film of Example 1 from the standpoint of having a significantly higher density than said film of Example 1.

Certain changes and modifications can be readily entered into in the practice of the present invention without departing from its intended spirit and scope. Therefore, it is to be fully understood that the invention is not intended nor should it be construed to be limited or in any manner restricted by or to the delineated and preferred embodiments thereof which are contained in the foregoing description and specification. Rather, the invention is to be interpreted and construed in the light of what is set forth and defined in the hereto appended claim.

What is claimed is:

Apparatus for manufacturing extruded foamed styrene polymer film having essentially equal tensile properties in biaxial directions which comprises, in cooperating combination, an extruder screw rotatably housed in an extruder barrel, said extruder screw consisting essentially of three contiguous sections which are a first section having a constant pitch and increasing root diameter in the forwarding direction of said screw, a middle section having a constant pitch and constant root diameter which is smaller than the adjacent root diameter of said first section, and an end section having a constant pitch and constant root diameter which is larger than the root diameter of said middle section; an extrusion die having a circular inlet end and a circular outlet orifice end, the volume of said die diminishing from said inlet end to said orifice end, the internal surfaces of said die being smooth and of gradually changing slope with respect to the axis of revolution of said die and terminating at the extremity of said orifice end in a short length having a slope of essentially zero with respect to the axis of revolution of said die, said length being between about $\frac{1}{10}$ and $\frac{1}{14}$ the diameter of said orifice end; separating means between said extruder screw and said extrusion die; a mandrel supported by said separating means and coaxially disposed within and at least coextensive with said die so as to create an annular orifice between said orifice end and said mandrel, said mandrel being in operative combination with means to admit gas to a surface of the mandrel encompassed by the circular outlet orifice end; collapsing rolls spaced from the extrusion die adapted to receive a bubble of foamed sheet material and collapse the sheet material to a flattened configuration; and means to supply a foamable resin to the extruder screw.

References Cited
UNITED STATES PATENTS

| | | | |
|---|---|---|---|
| 1,809,837 | 6/1931 | Ewart | 18—14 |
| 2,705,343 | 4/1955 | Hendry | 18—12 X |
| 3,023,456 | 3/1962 | Palfey. | |
| 3,051,990 | 4/1962 | Peterson | 18—14 |
| 3,123,860 | 3/1964 | Vesilind | 18—12 |

FOREIGN PATENTS 749,919   6/1956   Great Britain.

WILLIAM J. STEPHENSON, *Primary Examiner.*